United States Patent
Cornett et al.

(10) Patent No.: US 8,238,360 B2
(45) Date of Patent: Aug. 7, 2012

(54) HEADER REPLICATION IN ACCELERATED TCP (TRANSPORT CONTROL PROTOCOL) STACK PROCESSING

(75) Inventors: Linden Cornett, Portland, OR (US); David B. Minturn, Hillsboro, OR (US); Sujoy Sen, Portland, OR (US); Hemal V. Shah, Trabuco Canyon, CA (US); Anshuman Thakur, Beverton, OR (US); Gary Y. Tsao, Austin, TX (US); Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 11/140,092

(22) Filed: May 26, 2005

(65) Prior Publication Data

US 2006/0072564 A1   Apr. 6, 2006

Related U.S. Application Data

(63) Continuation-in-part of application No. 11/027,719, filed on Dec. 30, 2004, which is a continuation-in-part of application No. 10/815,895, filed on Mar. 31, 2004.

(51) Int. Cl.
*H04L 12/54* (2006.01)
(52) U.S. Cl. ........................................... 370/429
(58) Field of Classification Search ............... 710/1, 22, 710/26; 370/351, 389, 392, 395.1, 395.7–395.72, 370/412–413, 415, 417, 428–429
See application file for complete search history.

(56) References Cited

U.S. PATENT DOCUMENTS

| 5,090,011 | A | 2/1992 | Fukuta et al. |
| 6,314,100 | B1 | 11/2001 | Roach et al. |
| 6,389,468 | B1 | 5/2002 | Muller et al. |
| 6,438,604 | B1 * | 8/2002 | Kuver et al. ................. 709/234 |
| 6,675,200 | B1 | 1/2004 | Cheriton |
| 6,687,247 | B1 | 2/2004 | Wilford et al. |
| 6,751,709 | B2 * | 6/2004 | Seidl et al. ................... 711/137 |
| 6,907,042 | B1 | 6/2005 | Oguchi |
| 6,986,046 | B1 | 1/2006 | Tuvell et al. |
| 7,012,918 | B2 | 3/2006 | Williams |
| 7,035,289 | B2 | 4/2006 | Devine et al. |

(Continued)

FOREIGN PATENT DOCUMENTS

CN    1926834 A    3/2007

(Continued)

OTHER PUBLICATIONS

Definition of "any", http://www.merriam-webster.com/dictionary/any, accessed Jul. 6, 2011, Merriam-Webster, all pages.*

(Continued)

*Primary Examiner* — Derrick Ferris
*Assistant Examiner* — Omar Ghowrwal
(74) *Attorney, Agent, or Firm* — Grossman, Tucker, Perreault & Pfleger, PLLC

(57) ABSTRACT

In one embodiment, a method is provided. The method of this embodiment provides storing a packet header at a set of at least one page of memory allocated to storing packet headers, and storing the packet header and a packet payload at a location not in the set of at least one page of memory allocated to storing packet headers.

19 Claims, 14 Drawing Sheets

U.S. PATENT DOCUMENTS

| | | | | |
|---|---|---|---|---|
| 7,089,344 | B1* | 8/2006 | Rader et al. | 710/308 |
| 7,142,540 | B2 | 11/2006 | Hendel et al. | |
| 7,181,531 | B2 | 2/2007 | Pinkerton et al. | |
| 7,668,165 | B2 | 2/2010 | Hoskote et al. | |
| 7,783,769 | B2 | 8/2010 | Vasudevan et al. | |
| 7,788,391 | B2 | 8/2010 | Sen et al. | |
| 2002/0174255 | A1* | 11/2002 | Hayter et al. | 709/250 |
| 2003/0014544 | A1 | 1/2003 | Pettey | |
| 2003/0169738 | A1 | 9/2003 | McDaniel | |
| 2003/0217231 | A1 | 11/2003 | Seidl et al. | |
| 2004/0013117 | A1 | 1/2004 | Hendel | |
| 2004/0030806 | A1 | 2/2004 | Pandya | |
| 2004/0054837 | A1 | 3/2004 | Biran et al. | |
| 2004/0225748 | A1* | 11/2004 | Chong | 709/236 |
| 2005/0223128 | A1 | 10/2005 | Vasudevan et al. | |
| 2005/0223134 | A1 | 10/2005 | Vasudevan et al. | |
| 2006/0075142 | A1 | 4/2006 | Cornett et al. | |
| 2008/0126553 | A1* | 5/2008 | Boucher et al. | 709/230 |

FOREIGN PATENT DOCUMENTS

| | | | |
|---|---|---|---|
| EP | 0574140 | A1 | 12/1993 |
| EP | 0642246 | A2 | 3/1995 |
| EP | 0657824 | A1 | 6/1995 |
| EP | 1730919 | A1 | 12/2006 |
| HK | 1094291 | A1 | 3/2007 |
| JP | 06078001 | A | 3/1994 |
| JP | 06125365 | A | 5/1994 |
| JP | 07078112 | A | 3/1995 |
| JP | 07221780 | A | 8/1995 |
| JP | 2000332817 | A | 11/2000 |
| JP | 2002524005 | T2 | 7/2002 |
| JP | 2005539305 | T2 | 12/2005 |
| JP | 2006516054 | T2 | 6/2006 |
| SG | 125367 | | 9/2008 |
| WO | 2005104486 | | 11/2005 |
| WO | 2005104486 | A1 | 11/2005 |

OTHER PUBLICATIONS

Definition of "any", http://web.archive.org/web/20031203174852/http://dictionary.reference.com/search?q=any, accessed Jul. 6, 2011, citation Dec. 3, 2003, Lexico Publishing Group, all pages.*
Makineni, S. et al, "Performance Characterization of TCP/IP Packet Processing in Commercial Server Workloads", IEEE—Conference Proceedings Article, 2003, pp. 33-41, XP010670787.
Vasudevan et al, "Accelerated TCP (Transport Control Protocol) Stack Processing", U.S. Appl. No. 10/815,895, filed Mar. 31, 2004.
Cornett et al. "Storing Packet Headers", U.S. Appl. No. 10/954,248, filed Sep. 29, 2004.
Vasudevan et al. "Accelerated TCP (Transport Control Protocol) Stack Processing", U.S. Appl. No. 11/027,719, filed Dec. 30, 2004.
Office Action Received for EP Patent Application No. 04756431.5, mailed on Oct. 1, 2007, pp. 3.
Office Action Received for SG Patent Application No. 200606011-5, mailed on Nov. 22, 2007, pp. 11.
Office Action Received for SG Patent Application No. 200606011-5, mailed on Feb. 13, 2007, pp. 10.
Office Action Received for KR Patent Application No. 2006-7020469, mailed on Mar. 28, 2007, English translation of pp. 3.
Notice of Allowance Received for KR Patent Application No. 2006-7020469, mailed on Nov. 28, 2007, English translation of pp. 10.
Notice of Allowance Received for TW Patent Application No. 93119637, mailed on Dec. 20, 2006, pp. 3.
Office Action Received for U.S. Appl. No. 10/973,790, mailed on May 30, 2008, pp. 15.
Office Action Received for U.S. Appl. No. 11/027,719, mailed on Jun. 13, 2008, pp. 15.
International Preliminary Report on Patentability for PCT Patent Application No. PCT/US2004/021015, mailed on Oct. 12, 2006, pp. 8.
International Search Report / Written Opinion for PCT Patent Application No. PCT/US2004/021015, mailed on Dec. 23, 2004, pp. 12.
Non-Final Office Action received for U.S. Appl. No. 10/815,895 mailed on Jan. 8, 2008, pp. 19.
Final Office Action received for U.S. Appl. No. 10/815,895 mailed on Jul. 18, 2008, pp. 22.
Notice of Allowance received for SG Application No. 200606011-5 mailed on Jun. 25, 2008, pp. 8.
Office Action received for U.S. Appl. No. 10/815,895 mailed on Jan. 7, 2009, pp. 25.
Notice of Allowance received for U.S. Appl. No. 10/973,790 mailed on Dec. 30, 2008, pp. 13.
Office Action received for U.S. Appl. No. 11/027,719 mailed on Dec. 10, 2008. pp. 18.
Office Action received for Japanese Patent Application No. 2007-502782 mailed on Feb. 3, 2009. 5 pages (including 2 pages of English translation).
Non-Final Office Action received for U.S. Appl. No. 11/027,719 Mailed on May 7, 2009.
Office Action received for Chinese Patent Application No. 200480042550.4, Mailed on Aug. 14, 2009, 4 pages of Office Action and English translation of 7 pages.
Notice of Allowance received for U.S. Appl. No. 10/815,895, Mailed on Nov. 5, 2009, pp. 14.
Office Action received for Japanese Patent Application No. 2007-502782, Mailed on Aug. 4, 2009, 3 pages of Office Action and English translation of 2 pages.
Non-Final Office Action received for U.S. Appl. No. 11/027,719, Mailed on Nov. 9, 2009, pp. 18.
Notice of Allowance received for U.S. Appl. No. 10/973,790, Mailed on Sep. 29, 2009, pp. 7.
Notice of Allowance received for Japanese Patent Application No. 2007502782, mailed on Jan. 12, 2010.
Notice of Allowance received for U.S. Appl. No. 10/815,895, mailed on Feb. 23, 2010, 4 Pages.
Notice of Allowance received for U.S. Appl. No. 10/973,790, mailed on Feb. 22, 2010, 4 Pages.
Notice of Allowance received for U.S. Appl. No. 10/973,790, mailed on Apr. 1, 2010, 2 Pages.
Final Office Action received for U.S. Appl. No. 11/027,719, Mailed on Apr. 5, 2010, 15 Pages.
Supplemental Notice of Allowability received for U.S. Appl. No. 10/973,790, mailed on Apr. 26, 2010, 2 Pages.
Supplemental Notice of Allowance received for U.S. Appl. No. 10/815,895, mailed on May 20, 2010. pp. 3.
Supplemental Notice of Allowability received for U.S. Appl. No. 10/815,895, mailed on Jun. 9, 2010, 2 Pages.
Supplemental Notice of Allowability received for U.S. Appl. No. 10/973,790, mailed on Jun. 17, 2010, 5 Pages.
Non-Final Office Action received for U.S. Appl. No. 11/027,719, mailed on Feb. 11, 2011, 22 pages.
Office Action received for EP Patent Application No. 04756431.5 mailed on Oct. 19, 2007, 3 pages.
Office Action received for Japanese Patent Application No. 2007-502782, mailed on Feb. 3, 2009, 3 pages of Office Action and English translation of 2 pages.
Office Action received for Singaporean Patent Application 200606011-5, mailed on Feb. 13, 2007, 10 pages.
Office Action received for Singaporean Patent Application 200606011-5, mailed on Nov. 22, 2007, 11 pages.
Final Office Action received for U.S. Appl. No. 11/027,719, mailed on Dec. 10, 2008, 18 pages.
Second Office Action received for the Chinese patent Application No. 200480042550.4, mailed on Aug. 10, 2011, 5 pages of Translation and 3 pages of Office Action.
Notice of Allowance received to the U.S. Appl. No. 11/027,719, mailed on Oct. 13, 2011, 12 pages.

* cited by examiner

HEADER REPLICATION IN ACCELERATED TCP (TRANSPORT CONTROL PROTOCOL) STACK PROCESSING

PRIORITY INFORMATION

This application is a continuation-in-part (CIP) of U.S. patent application Ser. No. 11/027,719 entitled "Accelerated TCP (Transport Control Protocol) Stack Processing", filed Dec. 30, 2004, which is a CIP of U.S. patent application Ser. No. 10/815,895 entitled "Accelerated TCP (Transport Control Protocol) Stack Processing", filed Mar. 31, 2004, and claims the benefit of priority thereof.

RELATED APPLICATIONS

This application is related to U.S. patent application Ser. No. 10/954,248 entitled "Storing Packet Headers", filed Sep. 29, 2004.

FIELD

Embodiments of this invention relate to accelerated TCP (Transport Control Protocol) stack processing.

BACKGROUND

Networking has become an integral part of computer systems. Advances in network bandwidths, however, have not been fully utilized due to overhead that may be associated with processing protocol stacks. A protocol stack refers to a set of procedures and programs that may be executed to handle packets sent over a network, where the packets may conform to a specified protocol. For example, TCP/IP (Transport Control Protocol/Internet Protocol) packets may be processed using a TCP/IP stack.

Overhead may result from bottlenecks in the computer system from using the core processing module of a host processor to perform slow memory access functions such as data movement, as well as host processor stalls related to data accesses missing the host processor caches. Each memory access that occurs during packet processing may represent a potential delay as the processor awaits completion of the memory operation.

One approach to reducing overhead is to offload protocol stack processing. For example, TCP/IP stack processing may be offloaded onto a TCP/IP offload engine (hereinafter "OE"). In TOE, the entire TCP/IP stack may be offloaded onto a networking component, such as a MAC (media access control) component, of an I/O subsystem, such as a NIC (network interface controller). However, use of a TOE to process the entire TCP/IP stack may not scale well to support a large number of connections due to the memory requirements associated with storing contexts associated with these connections.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
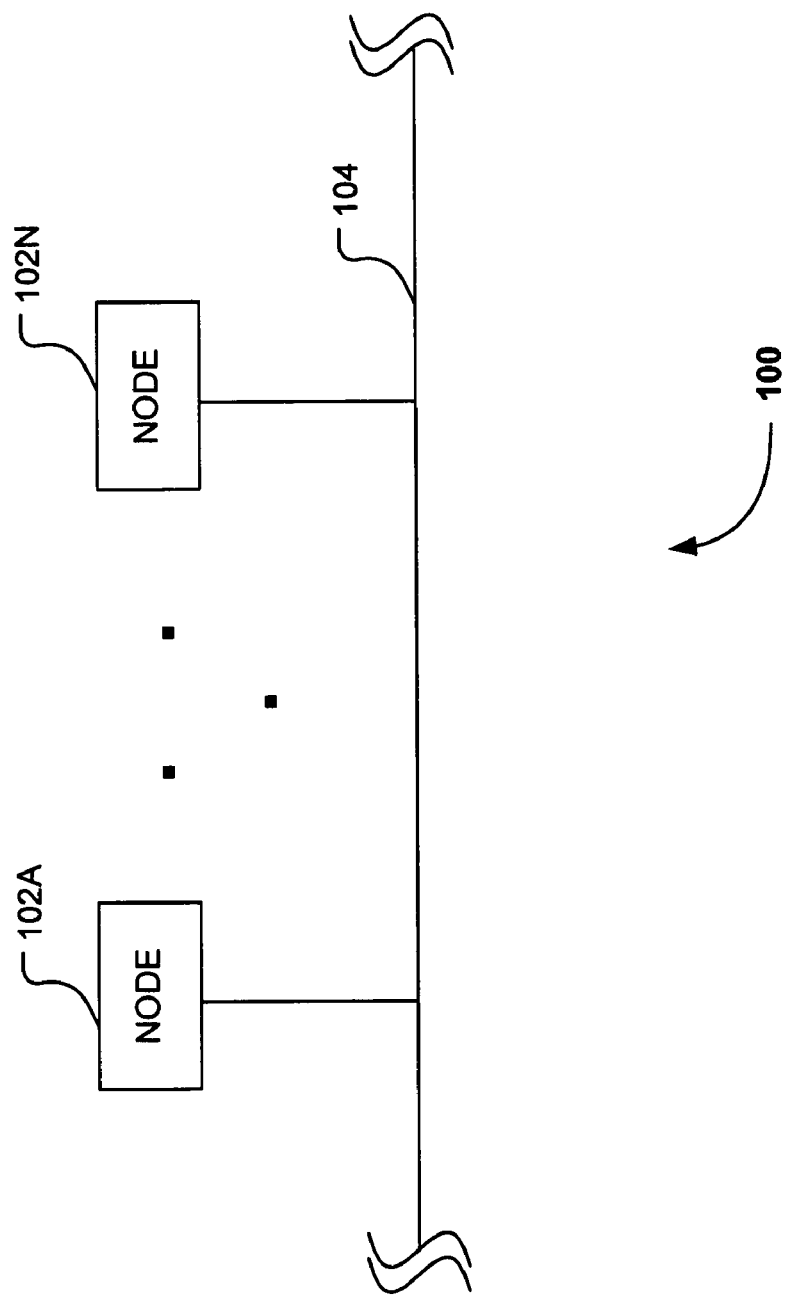
FIG. 1 illustrates a network.

FIG. 1 illustrates a network 100 in which embodiments of the invention may operate. Network 100 may comprise a plurality of nodes 102A, . . . 102N, where each of nodes 102A, . . . 102N may be communicatively coupled together via a communication medium 104. As used herein, components that are "communicatively coupled" means that the components may be capable of communicating with each other via wirelined (e.g., copper wires), or wireless (e.g., radio frequency) means. Nodes 102A . . . 102N may transmit and receive sets of one or more signals via medium 104 that may encode one or more packets.

As used herein, a "packet" means a sequence of one or more symbols and/or values that may be encoded by one or more signals transmitted from at least one sender to at least one receiver. As used herein, a "communication medium" means a physical entity through which electromagnetic radiation may be transmitted and/or received. Communication medium 104 may comprise, for example, one or more optical and/or electrical cables, although many alternatives are possible. For example, communication medium 104 may comprise air and/or vacuum, through which nodes 102A . . . 102N may wirelessly transmit and/or receive sets of one or more signals.

In network 100, one or more of the nodes 102A . . . 102N may comprise one or more intermediate stations, such as, for example, one or more hubs, switches, and/or routers; additionally or alternatively, one or more of the nodes 102A . . . 102N may comprise one or more end stations. Also additionally or alternatively, network 100 may comprise one or more not shown intermediate stations, and medium 104 may communicatively couple together at least some of the nodes 102A . . . 102N and one or more of these intermediate stations. Of course, many alternatives are possible.

Figure 2:
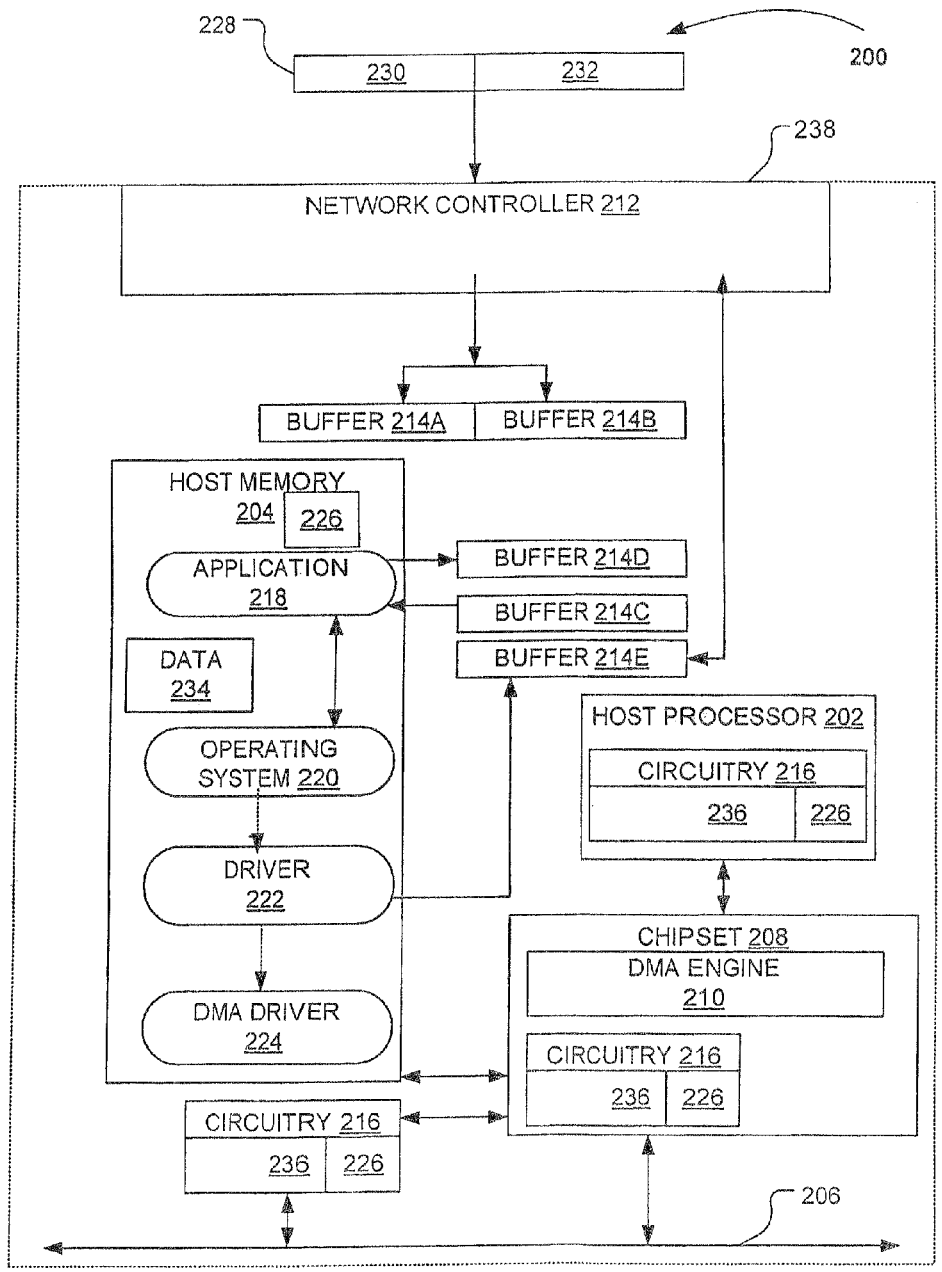
FIG. 2 illustrates a system according to one embodiment.

At least one of nodes 102A, . . . , 102N may comprise system 200, as illustrated in FIG. 2. System 200 may comprise host processor 202, host memory 204, bus 206, and chipset 208. (System 200 may comprise more than one host processor 202, host memory 204, bus 206, and chipset 208, or other types of processors, memories, and busses; however, the former are illustrated for simplicity of discussion, and are not intended to limit embodiments of the invention.) Host processor 202, host memory 204, bus 206, and chipset 208 may be comprised in a single circuit board, such as, for example, a system motherboard 238.

Host processor 202 may comprise a core processing module and other support modules that interface with other system elements. For example, a support module may include a bus unit that communicates with a memory controller on system 200. Host processor 202 may comprise, for example, an Intel® Pentium® microprocessor that is commercially available from the Assignee of the subject application. Of course, alternatively, host processor 202 may comprise another type of microprocessor, such as, for example, a microprocessor that is manufactured and/or commercially available from a source other than the Assignee of the subject application, without departing from embodiments of the invention.

Host processor 202 may be communicatively coupled to chipset 208. Chipset 208 may comprise a host bridge/hub system that may couple host processor 202 and host memory 204 to each other and to bus 206. Chipset 208 may also include an I/O bridge/hub system (not shown) that may couple the host bridge/bus system to bus 206. Chipset 208 may comprise one or more integrated circuit chips, such as those selected from integrated circuit chipsets commercially available from the Assignee of the subject application (e.g., graphics memory and I/O controller hub chipsets), although other one or more integrated circuit chips may also, or alternatively, be used.

Bus 206 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 106 instead may comprise a bus that complies with the PCI-X Specification Rev. 1.0a, Jul. 24, 2000, (hereinafter referred to as a "PCI-X bus"), or a bus that complies with the PCI-E Specification Rev. PCI-E (hereinafter referred to as a "PCI-E bus"), as specified in "The PCI Express Base Specification of the PCI Special Interest Group", Revision 1.0a, both available from the aforesaid PCI Special Interest Group, Portland, Oreg., U.S.A. Also, alternatively, bus 106 may comprise other types and configurations of bus systems.

System 200 may additionally comprise circuitry 216. Circuitry 216 may comprise one or more circuits to perform one or more operations described herein as being performed by, for example, a driver 222 and/or network controller 212. In embodiments of the invention, driver 222 may perform accelerated processing as described below, and may be referred to as a TCP-A (Transport Control Protocol—Accelerated) driver.

References to TCP-A driver herein may describe any driver that may perform accelerated processing when called upon to perform accelerated processing, and references to TCP driver herein may describe any driver that may perform non-accelerated processing when called upon to perform non-accelerated processing. TCP-A driver need not be a distinct driver from TCP driver, but may instead comprise a driver that may perform either non-accelerated or accelerated processing. For example, driver 222 may comprise a TCP driver that may also perform accelerated processing.

Circuitry 216 may be hardwired to perform the one or more operations, and/or may execute machine-executable instructions to perform these operations. For example, circuitry 216 may comprise memory 236 that may store machine-executable instructions 226 that may be executed by circuitry 216 to perform these operations. Instead of being comprised in host processor 202, or chipset 208, some or all of circuitry 216 may be comprised in a circuit card (not shown), and/or other structures, systems, and/or devices that may be, for example, comprised in motherboard 238, and/or communicatively coupled to bus 206, and may exchange data and/or commands with one or more other components in system 200. Circuitry 216 may comprise, for example, one or more digital circuits, one or more analog circuits, one or more state machines, programmable circuitry, and/or one or more ASIC's (Application-Specific Integrated Circuits).

System 200 may additionally comprise one or more memories to store machine-executable instructions 226 capable of being executed, and/or data capable of being accessed, operated upon, and/or manipulated by circuitry, such as circuitry 216. For example, these one or more memories may include host memory 204, or memory 236. One or more memories 204, 236 may, for example, comprise read only, mass storage, random access computer-readable memory, and/or one or more other types of machine-readable memory. The execution of program instructions 226 and/or the accessing, operation upon, and/or manipulation of data by circuitry 216 may result in, for example, circuitry 216 carrying out some or all of the operations described herein as being carried out by various hardware and/or software components in system 200.

For example, machine-executable instructions 226 may comprise a set of instructions for an application 218; a set of instructions for operating system 220; a set of instructions for TCP-A driver 222; and/or a set of instructions for DMA driver 224. In one embodiment, circuitry 216 of host processor 202 may execute machine-executable instructions 226 for TCP-A driver 222, for DMA driver 224, and for operating system 220. Machine-executable instructions 226 may execute in memory by circuitry 216, such as in host processor 202, and/or by circuitry 216 in general.

Figure 3:
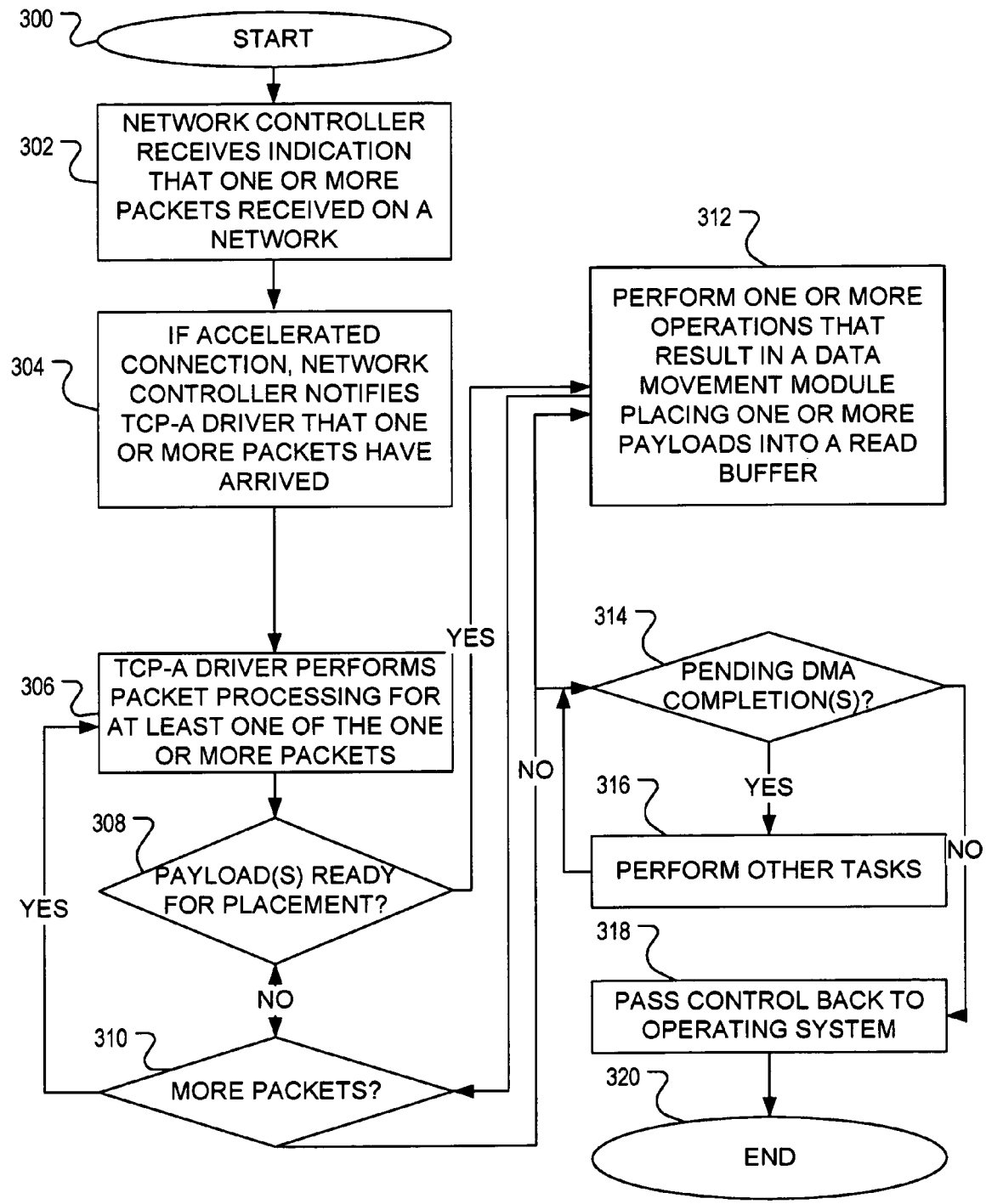
FIG. 3 is a flowchart illustrating a method according to one embodiment.

A method according to one embodiment is illustrated in the flowchart of FIG. 3 with reference to system 200 of FIG. 2. The method begins at block 300, and continues to block 302 where network controller 212 may receive an indication that one or more packets 228 (only one shown), each comprising a header 230 and a payload 232, have been received from network 100. In an embodiment, network controller 212 may perform stateless assists. "Stateless assists" refer to operations that may be performed independently of the connection context. As used herein, "connection context" refers to information about a connection. For example, the information may comprise the sequence number of the last packet sent/received, and amount of memory available. Performing stateless assists may reduce the burden on the network controller 212. Stateless assists may include, but are not limited to, splitting the header and payload, header parsing, hashing, posting queues, large send offload, and checksum offload.

For example, for each packet 228, network controller 212 may split header 230 and payload 232 from packet 228, and post each 230, 232 to one or more buffers 214A, 214B. In one embodiment, header 230 may be posted to a first buffer such as header buffer 214A, and payload 232 may be posted to a second buffer such as data buffer 214B. This feature in which a packet is split into a header portion and a payload portion is referred to herein as a split header feature. With split header, circuitry may perform parsing to determine where the header ends and the payload starts. The header and payload may be stored in separate locations (e.g., first and second buffers).

In another embodiment, header 230 may additionally be stored in the second buffer. In an embodiment, this may result from using the split header feature, and placing the header in the same location in which the payload is stored. In other embodiments, this may result from using a header replication feature. In header replication, circuitry may store the header and the payload (i.e., the packet) at a first location (e.g., second buffer), and store a predetermined number of bytes of the packet in a second location (e.g., first buffer). The predetermined number may correlate to a number of bytes of the header in a packet, and may be configurable. With header replication, circuitry does not need to perform parsing to determine where the header ends and the payload begins.

The one or more packets 228 may be comprised in one or more groups, and each group of packets 228 may be transmitted and/or received over a connection. The one or more packets 228 may be received in response to a read data request from, for example, application 218.

"Application" refers to one or more programs that use the network. An application 218 may comprise, for example, a web browser, an email serving application, a file serving application, or a database application. In conjunction with a read data request, application 218 may designate destination read buffer 214C where application 218 may access the requested data. In conjunction with a transmit data request, application 218 may write data to be transmitted to source buffer 214D.

"Network controller" refers to any combination of hardware and/or software that may process one or more packets sent and/or received over a network. In an embodiment, network controller may comprise, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

A "connection" as used herein refers to a logical pathway to facilitate communications between a first node on a network and a second node on the network. A connection may facilitate communications for one or more transactions between the first node and the second node. A "transaction" refers to a request to send or receive data, such as may be initiated by an application, such as application 218, on a system, such as system 200. Each connection may be associated with a connection context.

In an embodiment, network controller 212 may determine if the connection is an accelerated connection in which one or more packets 228 may be offloaded to TCP-A driver 222 for accelerated processing prior to splitting header 230 and payload 232 and continuing to block 304. In other embodiments, network controller 212 may split one or more packets 228 into header 230 and payload 232 without first determining if connection is an accelerated connection. One example of how to determine if a connection is an accelerated connection is described in U.S. patent application Ser. No. 11/018,448 filed on Dec. 20, 2004, entitled "Connection Context Prefetch".

At block 304, if the connection is an accelerated connection, and therefore one or more packets 228 may be candidates for accelerated packet processing (packets may be referred to as offload packets), network controller 212 may notify a driver that one or more packets 228 have arrived, and may indicate header buffer 214A and data buffer 214B to a driver (e.g., TCP-A driver) for accelerated processing, such as from blocks 306-318. Alternatively, if the connection is not an accelerated connection, and therefore one or more packets 228 may not be candidates for accelerated processing (packets may be referred to as non-offload packets), network controller 212 may indicate data buffer 214B (which includes header portion and data portion of the packet) to a driver (e.g., TCP driver) to perform regular, non-accelerated processing.

In one embodiment, network controller 212 may notify TCP-A driver 222 by notifying operating system 220 in accordance with an interrupt moderation scheme. An interrupt moderation scheme refers to a condition where an interrupt may be asserted for every n packets received by network controller 212. Thus, if network controller 212 receives n or more packets, network controller 212 may notify operating system 220 that packets have arrived. Likewise, if network controller 212 receives less than n packets, network controller 212 may instead wait until more packets are received before notifying operating system 220. In one embodiment, operating system 220 may then notify TCP-A driver 222 that packets are ready to be processed.

At block 306, TCP-A driver 222 may perform packet processing for at least one of the one or more packets. Packet processing may be performed by the TCP-A driver 222 retrieving header 230 from post buffer 214A, parsing the header 230 to determine the connection context associated with the current connection (if this has not already been done), and performing TCP protocol compliance. TCP protocol compliance may comprise, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; and ensuring that the timestamps are within an expected time range.

TCP-A driver 222 may fetch a next header to process prior to completing the processing of a current header. This may ensure that the next header is available in the host processor's caches (not shown) before the TCP-A driver 222 is ready to perform TCP processing on it, thereby reducing host processor stalls. Prefetching the header is described in more detail below. The method may continue to block 308.

In one embodiment, TCP-A driver 222 may additionally determine if a connection associated with a packet is to be accelerated prior to performing packet processing. This may be done, for example, if network controller 212 has not already made this determination. TCP-A driver 222 may accelerate select connections. Select connections may comprise, for example, connections that are long-lived, or which comprise large data. If TCP-A driver 222 determines that network connection is to be accelerated, TCP-A driver 222 may perform packet processing as described at block 306. If TCP-A driver 222 determines that network connection is not to be accelerated, the method may continue to block 318.

At block 308, TCP-A driver 222 may determine if one or more payloads 232 placed in post buffer 214B are ready for placement. A payload 232 may be ready for placement if, for example, the corresponding header has been successfully processed, and a read buffer, such as read buffer 214C, has been designated. If at block 308, payload 232 is not ready for placement, the method may continue to block 310. In one embodiment, TCP-A driver 222 may determine if there are one or more payloads 232 ready for placement at anytime. For example, if it is determined that payload 232 is not ready for placement, TCP-A driver 222 may wait for some period of time before it makes this determination again. Where payload 232 cannot be placed because a read buffer 214C does not exist, for example, TCP-A driver 222 may alternatively or additionally at anytime indicate to operating system 220 the presence of payload 232 ready to be placed. Operating system 220 may then designate a buffer, or may ask application 218 to designate a buffer. If there are one or more payloads ready for placement, the method may continue to block 312.

At block 310, TCP-A driver 222 may determine if there are more packets 228 to process, for example in post buffer 214A, of the n packets for the current interrupt. If there are more packets 228 to process, the method reverts to block 306. If there are no more packets 228, and one or more packets 228 have not been previously placed, and are ready for placement, the method may continue to block 312. If there are no more packets 228 to process, and there are no previous packets 228 to place, the method may continue to block 314.

At block 312, TCP-A driver 222 may perform one or more operations that result in a data movement module placing one or more corresponding payloads 232 into a read buffer, such as read buffer 214C. As used herein, a "data movement module" refers to a module for moving data from a source to a destination without using the core processing module of a host processor, such as host processor 202. A data movement module may comprise, for example, a DMA engine as described below.

In one embodiment, for example, TCP-A driver 222 may send a request to DMA driver 224, and DMA driver 224 may schedule a request with DMA engine 210 to write the one or more payloads 232 from post buffer 214B to read buffer 214C. In another embodiment, TCP-A driver 222 may directly program DMA engine 210 to write the one or more payloads 232 from post buffer 214B to read buffer 214C. DMA driver 224 may be a standalone driver, or part of some other driver, such as TCP-A driver 222. Rather than being part of chipset 208, DMA engine 210 may be a support module of host processor 202. By using the DMA engine for placement of data, host processor 202 may be freed from the overhead of performing data movements, which may result in the host processor 202 running at much slower memory speeds compared to the core processing module speeds. Following the DMA engine 210 scheduling, the method may revert to block 310 to determine if there are additional packets 228 to process.

At block 314, TCP-A driver 222 may determine if there are any pending DMA completions for the current interrupt. Alternatively, TCP-A driver 222 may look for DMA completions at anytime. A "pending completion" as used herein refers to the completion of a request. In one embodiment, a pending completion refers to the completion of a request to DMA engine 210 to write one or more payloads 232. If, at block 314, there are one or more pending DMA completions for the current interrupt, the method may continue to block 316. If at block 314 there are no pending DMA completions for the current interrupt, the method may continue to block 318.

At block 316, TCP-A driver 222 may perform other tasks. Other tasks may include looking for more packets in a subsequent interrupt, setting up the DMA engine 210 to issue an interrupt upon completion of a last queued task for the current interrupt, or other housekeeping, such as transmitting data, and performing TCP timer related tasks.

At block 318, TCP-A driver 222 may pass control back to operating system 220. If all packets 228 have been processed, operating system 220 may wait for a next interrupt. If one or more packets 228 have still not been processed, operating system 220 may notify a TCP driver (not shown) rather than TCP-A driver 222, where the TCP driver may perform TCP stack processing by performing packet processing, and by using the core processing module of host processor 202 to perform data transfers. TCP driver may implement one or more host network protocols, also known as host stacks, to process one or more packets 228.

The method may end at block 320.

Figure 4:
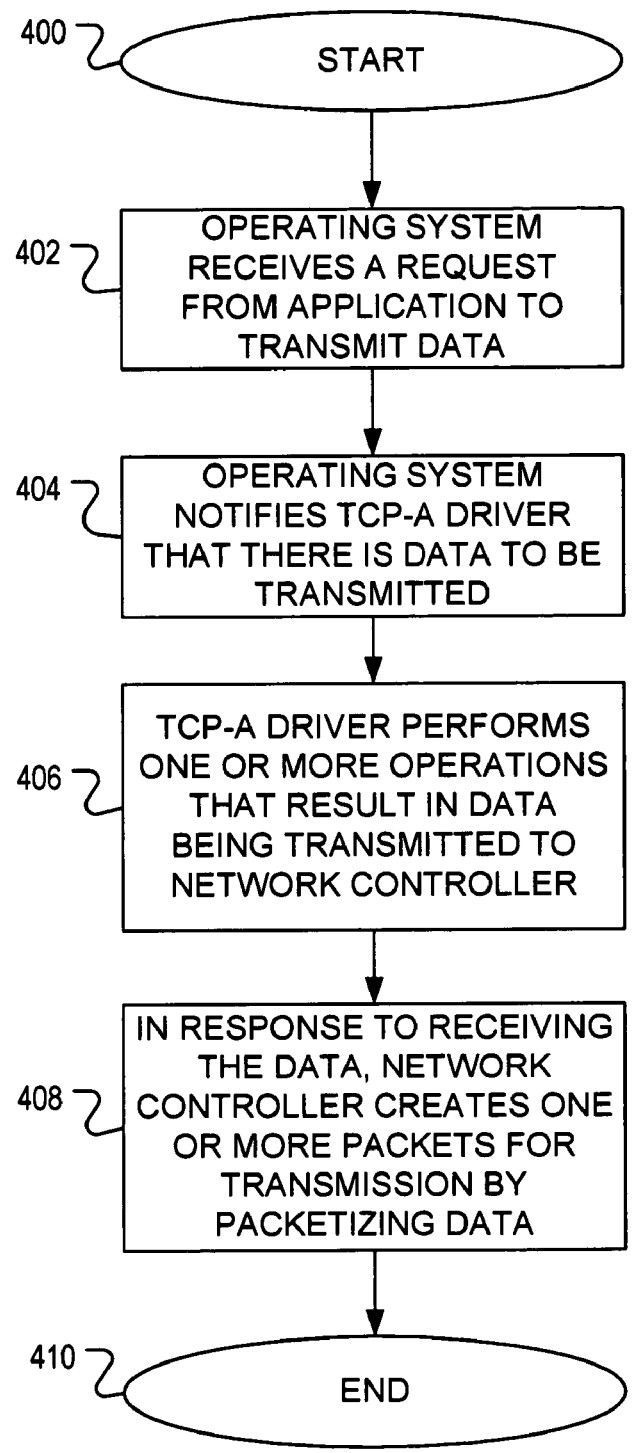
FIG. 4 is a flowchart illustrating a method according to another embodiment.

A method according to another embodiment is illustrated in FIG. 4. The method begins at block 400 and continues to block 402 where operating system 220 may receive a request from application 218 to transmit data 234 placed in buffer 214D. Operating system 220 may perform preliminary checks on data 234. Preliminary checks may include, for example, obtaining the associated connection context. In a TCP/IP connection, for example, connection context may comprise packet sequence numbers to identify the order of the packets, buffer addresses of buffers used to store data, and timer/timestamp information for retransmissions.

At block 404, operating system 220 may notify TCP-A driver 222 that there is data 234 to be transmitted from buffer 214D.

At block 406, TCP-A driver 222 may perform one or more operations that result in data 234 being transmitted to network controller 212. For example, these one or more operations may include TCP-A driver 222 programming DMA engine 210 to transmit data 234 from source buffer 214D to network controller 212. Alternatively, TCP-A driver 222 may queue a buffer, such as queued buffer 214E, to network controller 212, where network controller 212 may instead read data 234 from queued buffer 214E. Source buffer 214D may be designated by application 218, for example, and queued buffer 214E may be designated by network controller 212, for example.

In one embodiment, TCP-A driver 222 may program DMA engine 210 to transmit data if the data is small, and TCP-A driver 222 may queue a buffer, such as queued buffer 214E, if the data is large. As used herein, "queuing a buffer" means to notify a controller that there is a buffer from which it can access data. For example, TCP acknowledgment packets to acknowledge receipt of packets may typically be relatively small-sized packets, and may be sent by TCP-A driver 222 to network controller 212 by TCP-A driver 222 programming DMA engine 210 to transmit data 234. As another example, storage applications that send large files over the network may be relatively large, and may therefore be sent by TCP-A driver 222 to network controller 212 by queuing buffer 214E.

At block 408, in response to receiving the data, network controller 212 may create one or more packets for transmission by packetizing the data. In one embodiment, network controller 212 may packetize data by performing segmentation on the data. "Segmentation" refers to breaking the data into smaller pieces for transmission. In one embodiment, network controller 212 may include a MAC, and segmentation may be referred to as a large send offload, wherein MAC frames may be created for transmission of data 234 over the network. Network controller 212 may receive data directly from TCP-A driver 222, or by accessing queued buffer 214E.

The method may end at block 410. Thereafter, operating system 220 may send a completion notification to application 218. Furthermore, source buffer 214D may be returned to application 218, and application may use the buffer for other purposes.

Figure 5:
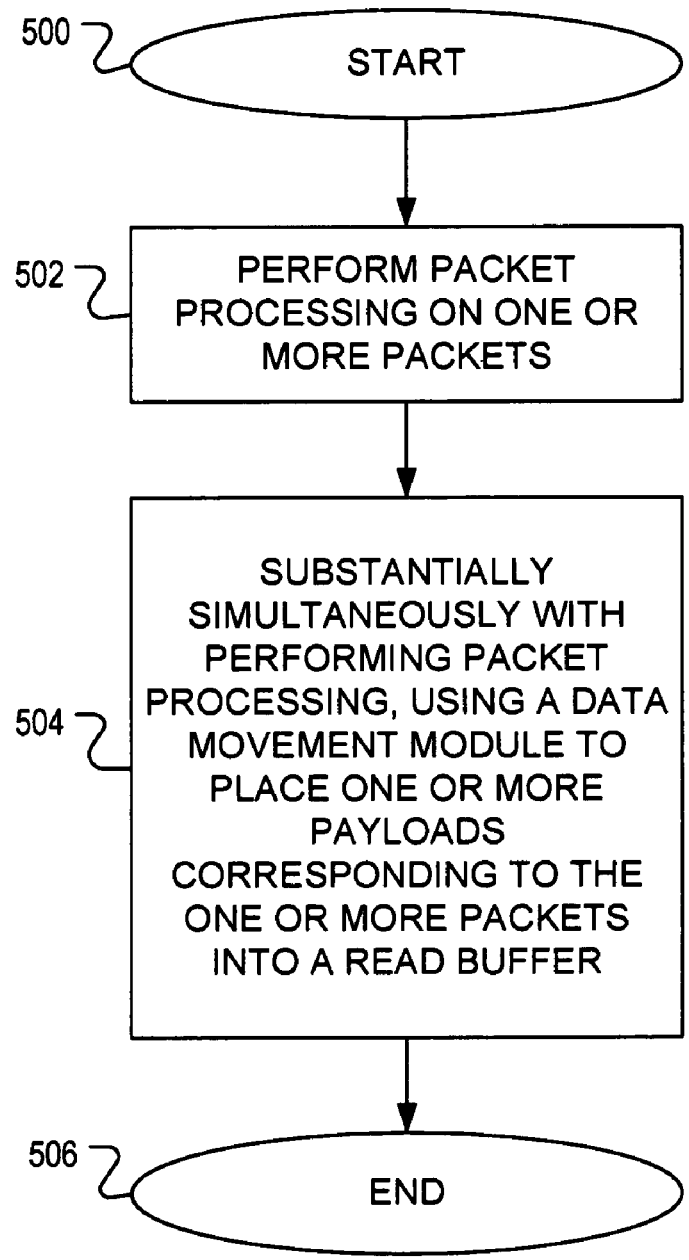
FIG. 5 is a flowchart illustrating a method according to another embodiment.

A method for accelerated processing in accordance with another embodiment is illustrated in FIG. 5. The method of FIG. 5 begins at block 500 and continues to block 502 where packet processing may be performed on one or more packets. Packet processing may be performed, for example, as described at block 306 of FIG. 3. This may be performed by, for example, a transport protocol driver, where the protocol may include, for example, TCP/IP. The method may continue to block 504.

At block 504, substantially simultaneously with performing packet processing, a data movement module may be used to place one or more payloads corresponding to the one or more packets into a read buffer. Use of a data movement module to place one or more payloads corresponding to the one or more packets into a read buffer may be performed, for example, as described at block 312 of FIG. 3. As used herein, "substantially simultaneously" means at or around the same time as another process so that there is some overlap between the two processes, but does not necessarily mean that the two processes must begin and end execution at the same time. Thus, data movement may occur at some point during packet processing, including prior to packet processing, subsequent to packet processing, and/or during packet processing. The method may continue to block 506.

At block 506, the method of FIG. 5 may end.

As discussed above, each memory operation that occurs during packet processing may represent a potential delay. Given that reading a packet header may occur for nearly every packet, storing the header in a processor's cache can greatly improve packet processing speed. Generally, however, a given packet's header will not be in cache when the stack first attempts to read the header. For example, in many systems, a NIC receiving a packet writes the packet into memory and signals an interrupt to a processor. In this scenario, the protocol software's initial attempt to read the packet's header results in a "compulsory" cache miss and an ensuing delay as the packet header is retrieved from memory.

FIGS. 6A-6D illustrate techniques that may increase the likelihood that a given packet's header will be in a processor's cache when needed by collecting packet headers into a relatively small set of memory pages. By splitting a packet apart and excluding packet payloads from these pages, a larger number of headers can be concentrated together. This reduced set of pages can then be managed in a way to permit effective prefetching of packet headers into the processor cache before the protocol stack processes the header.

Figure 6A:
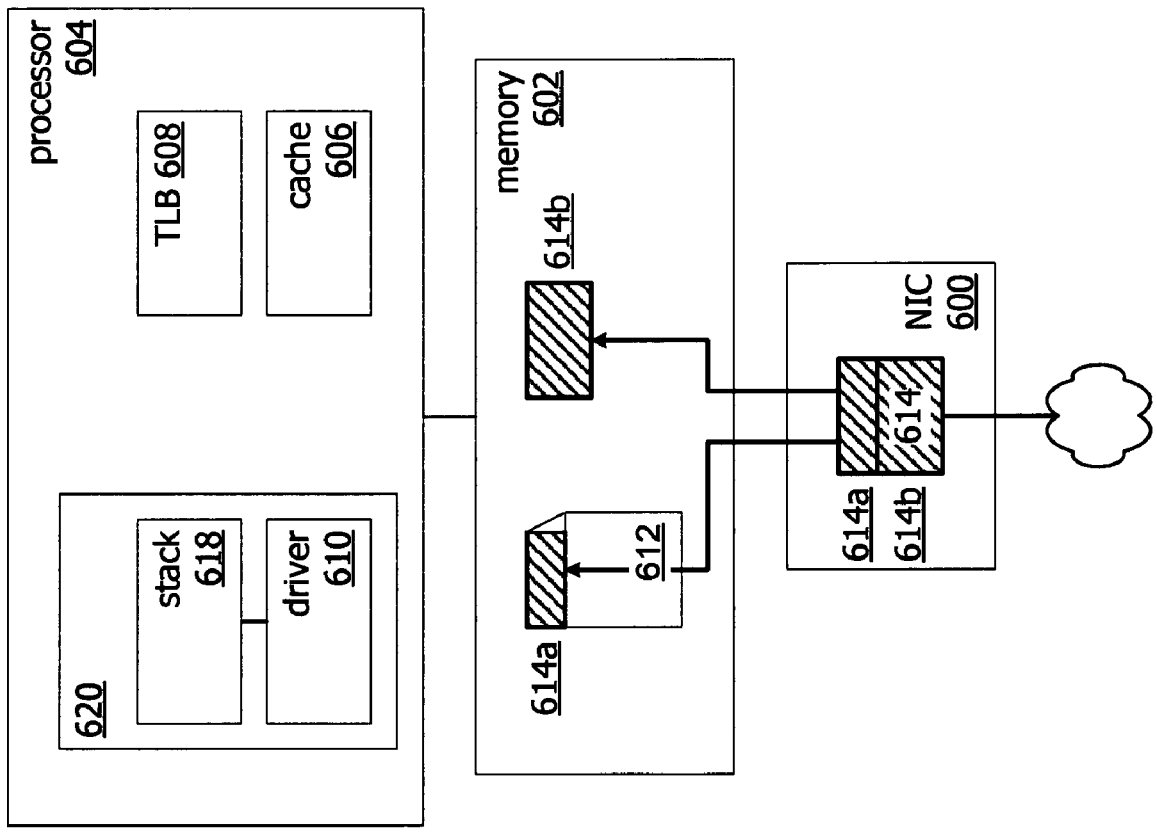
FIGS. 6A-6D illustrate storage of packet headers.

In greater detail, FIG. 6A depicts a sample computer system that features a processor 604, memory 602, and a NIC 600. Memory 602 is organized as a collection of physical pages of contiguous memory addresses. The size of a page may vary in different implementations.

In this sample system, the processor 604 includes a cache 606 and a Translation Lookaside Buffer (TLB) 608. Briefly, many systems provide a virtual address space that greatly exceeds the available physical memory. The TLB 608 is a table that cross-references between virtual page addresses and the currently mapped physical page addresses for recently referenced pages of memory. When a request for a virtual address results in a cache miss, the TLB 608 is used to translate the virtual address into a physical memory address. However, if a given page is not in the TLB 608 (e.g., a page not having been accessed in time), a delay is incurred in performing address translation while the physical address is determined.

As shown, the processor 604 also executes instructions of a driver 620 (e.g., TCP driver that performs both accelerated and nonaccelerated processing) that includes a protocol stack 618 (e.g., a TCP/IP protocol stack) and a base driver 610 that controls and configures operation of NIC 600. Potentially, the base driver 610 and stack 618 may be implemented as different layers of an NDIS (Microsoft Network Driver Interface Specification) compliant driver 620 (e.g., an NDIS 6.0 compliant driver).

As shown in FIG. 6A, in operation the NIC 600 receives a packet 614 from a network (shown as a cloud). As shown, the controller 600 can "split" the packet 614 into its constituent header 614a and payload 614b. For example, the controller 600 can determine the starting address and length of a packet's 614 TCP/IP header 614a and starting address and length of the packet's 614 payload 614b. Instead of simply writing a verbatim, contiguous copy of the packet 614 into memory 602, the controller 600 can cause the packet components 614a, 614b to be stored separately. For example, as shown, the controller 600 can write the packet's header 614a into a physical page 612 of memory 602 used for storage of packet headers, while the packet payload 614b is written into a different location (e.g., a location not contiguous or in the same page as the location of the packet's header 614a).

Figure 6B:
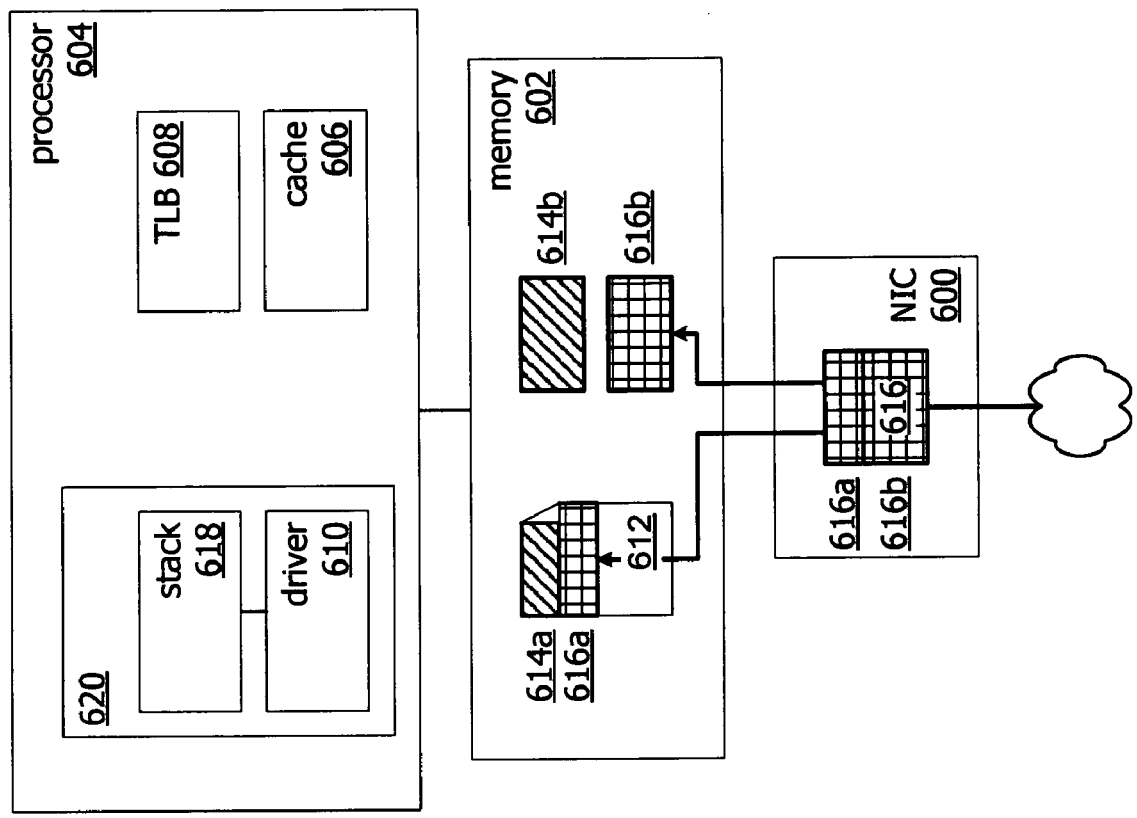

As shown in FIG. 6B, this process can repeat for subsequently received packets. That is, for received packet 616, the controller 600 can append the packet's header 616a to the headers stored in page 612 and write the packet's payload 616b to a separate location somewhere else in memory 602.

To avoid an initial cache miss, a packet's header may be prefetched into cache 606 before header processing by stack 618 software. For example, driver 610 may execute a prefetch instruction that loads a packet header from memory 602 into cache 606. As described above, in some architectures, the efficiency of a prefetch instruction suffers when a memory access falls within a page not currently identified in the processor's 604 TLB 608. By compactly storing the headers of different packets within a relatively small number of pages, these pages can be maintained in the TLB 608 without occupying an excessive number of TLB entries. For example, when stripped of their corresponding payloads, 32 different 128-byte headers can be stored in a single 4-kilobyte page instead of one or two packets stored in their entirety.

Figure 6C:
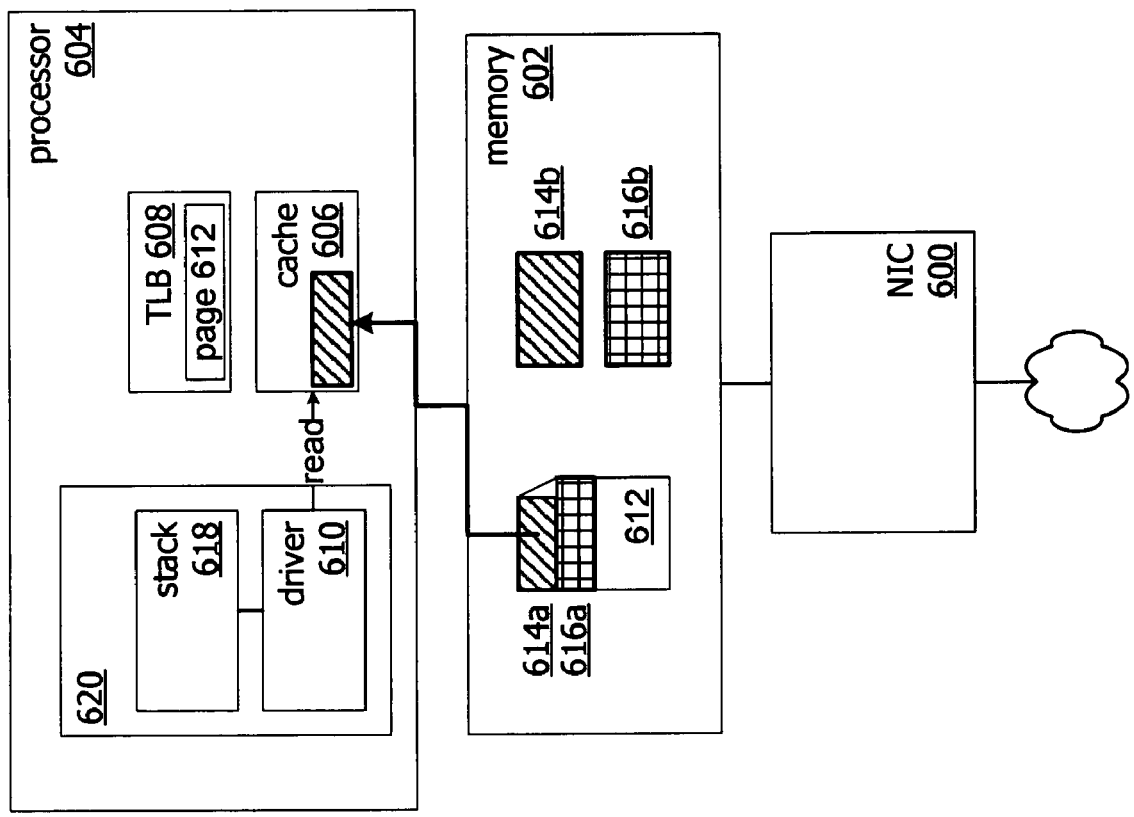

As shown in FIG. 6C, the page(s) 612 storing headers can be maintained in the TLB 608, for example, by a memory access (e.g., a read) to a location in the page. This "touch" of a page may be repeated at different times to ensure that a page is in the TLB 608 before a prefetch. For example, a read of a page may be performed each time an initial entry in a page of headers is written. Assuming that packet headers are stored in page 612 in the order received, performing a memory operation for the first entry will likely keep the page 612 in the TLB 608 for the subsequently added headers.

Figure 6D:
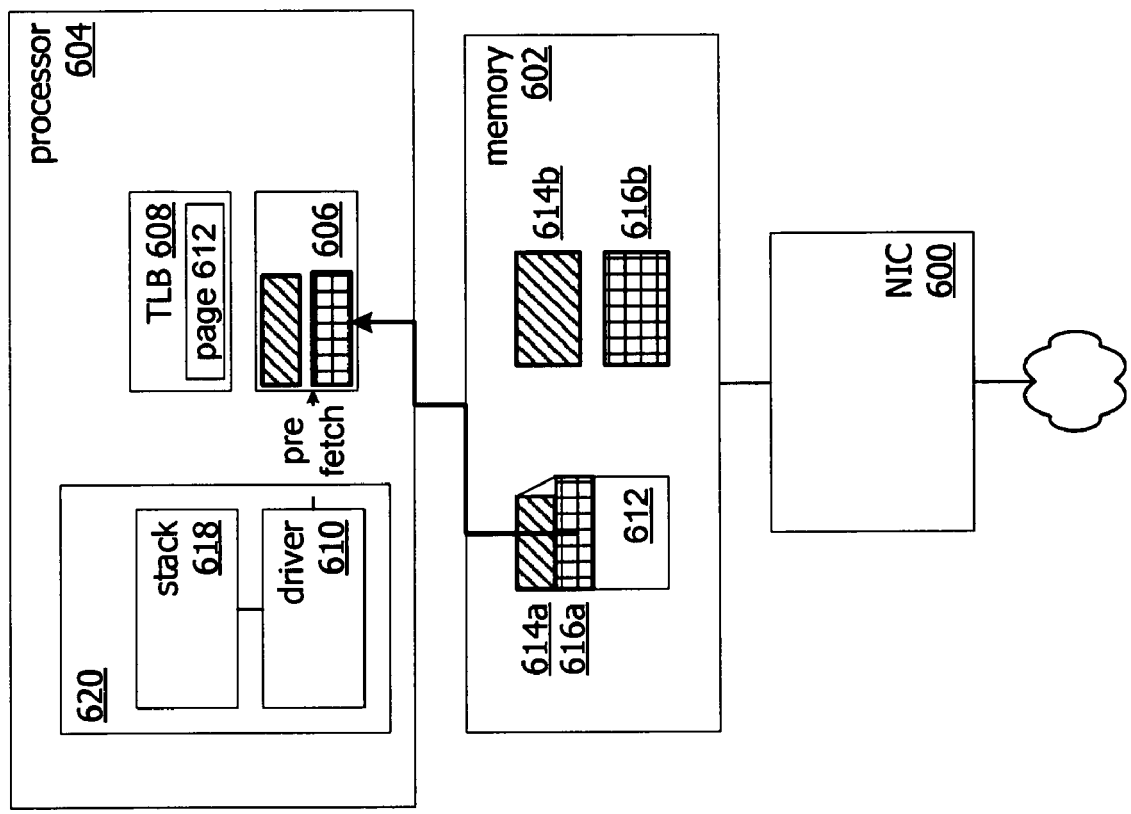

As shown in FIG. 6D, once included in the TLB 608, prefetch operations load the header(s) stored in the page(s) 612 into the processor 604 cache 606 without additional delay. For example, as shown, the base driver 610 can prefetch the header 616a for packet 616 before TCP processing of the header by the protocol stack 618.

Figure 7:
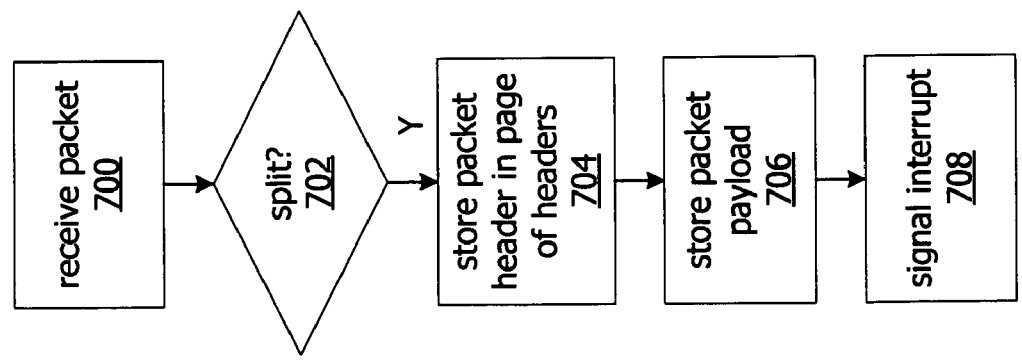
FIG. 7 is a flowchart illustrating a process to store packet headers.

FIG. 7 illustrates sample operation of a NIC participating in the scheme described above. As shown, after receiving 700 a packet, the controller can determine 702 whether to perform header splitting. For example, the controller may only perform splitting for TCP/IP packets or packets belonging to particular flows (e.g., particular TCP/IP connections or Asynchronous Transfer Mode (ATM) circuits).

For packets selected for splitting, the controller can cause storage 704 (e.g., via Direct Memory Access (DMA)) of the packet's header in the page(s) used to store headers and separately store 706 the packet's payload. For example, the controller may consume a packet descriptor from memory generated by the driver that identifies an address to use to store the payload and a different address to use to store the header. The driver may generate and enqueue these descriptors in memory such that a series of packet headers are consecutively stored one after the other in the header page(s). For instance, the driver may enqueue a descriptor identifying the start of page 612 for the first packet header received (e.g., packet header 614b in FIG. 6A) and enqueue a second descriptor identifying the following portion of page 612 for the next packet header (e.g., packet header 616b in FIG. 6B). Alternately, the controller may maintain pointers into the set of pages 612 to store headers, essentially using the pages as a ring buffer for received headers.

As shown, after writing the header, the controller signals 708 an interrupt to the driver indicating receipt of a packet. Potentially, the controller may implement an interrupt moderation scheme and signal an interrupt after some period of time and/or the receipt of multiple packets.

Figure 8:
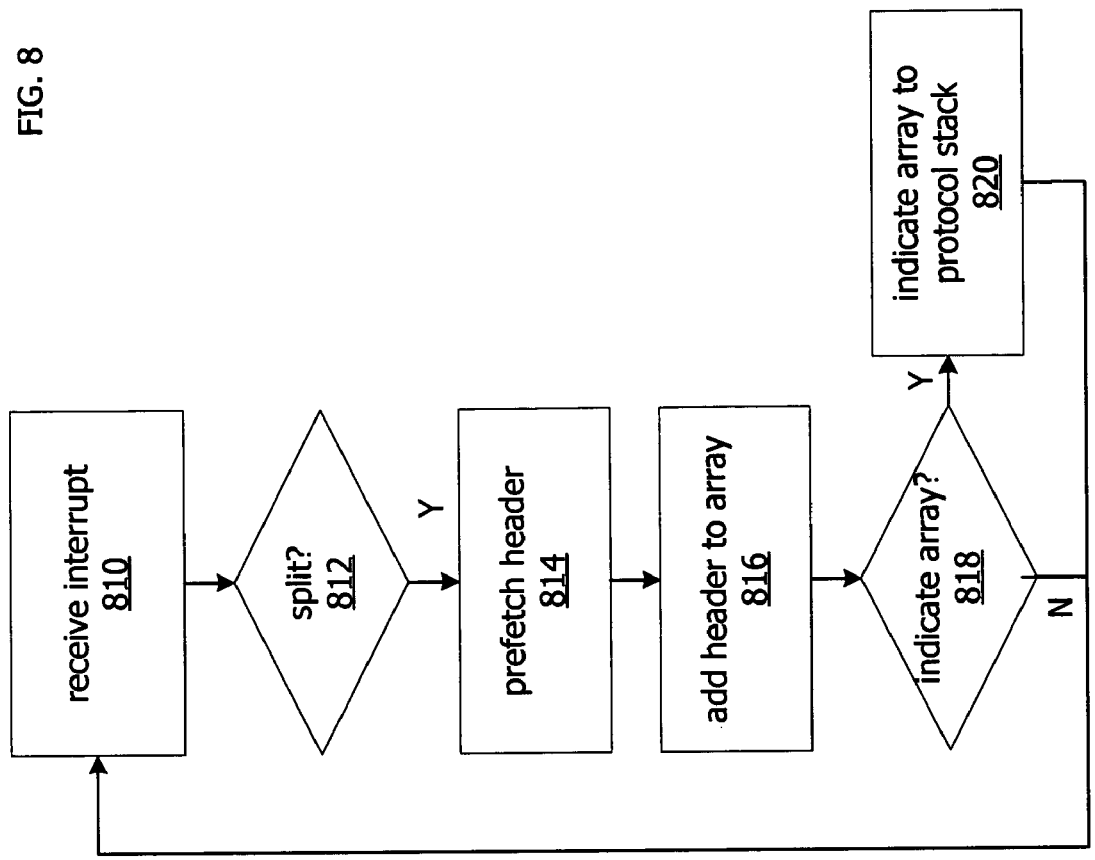
FIG. 8 is a flowchart illustrating a process to prefetch packet headers into a cache.

FIG. 8 illustrates sample operation of the driver in this scheme. As shown, after receiving 810 an interrupt for a split packet 812, the driver can issue a prefetch 814 instruction to load the header into the processor's cache (e.g., by using the packet descriptor's header address). Potentially, the packet may then be indicated to the protocol stack. Alternately, however, the driver may defer immediate indication and, instead, build an array of packets to indicate to the stack in a batch. For example, as shown, the driver may add 816 the packet's header to an array and only indicate 820 the array to the stack if 816 some threshold number of packets have be added to the array or if some threshold period of time has elapsed since indicating a previous batch of packets. Since prefetching data into the cache into memory takes some time, moderating indication to the stack increases the likelihood that prefetching completes for several packet headers before the data is needed. Depending on the application, it may also be possible to speculatively prefetch some of the payload data before the payload is accessed by the application.

Figure 9:
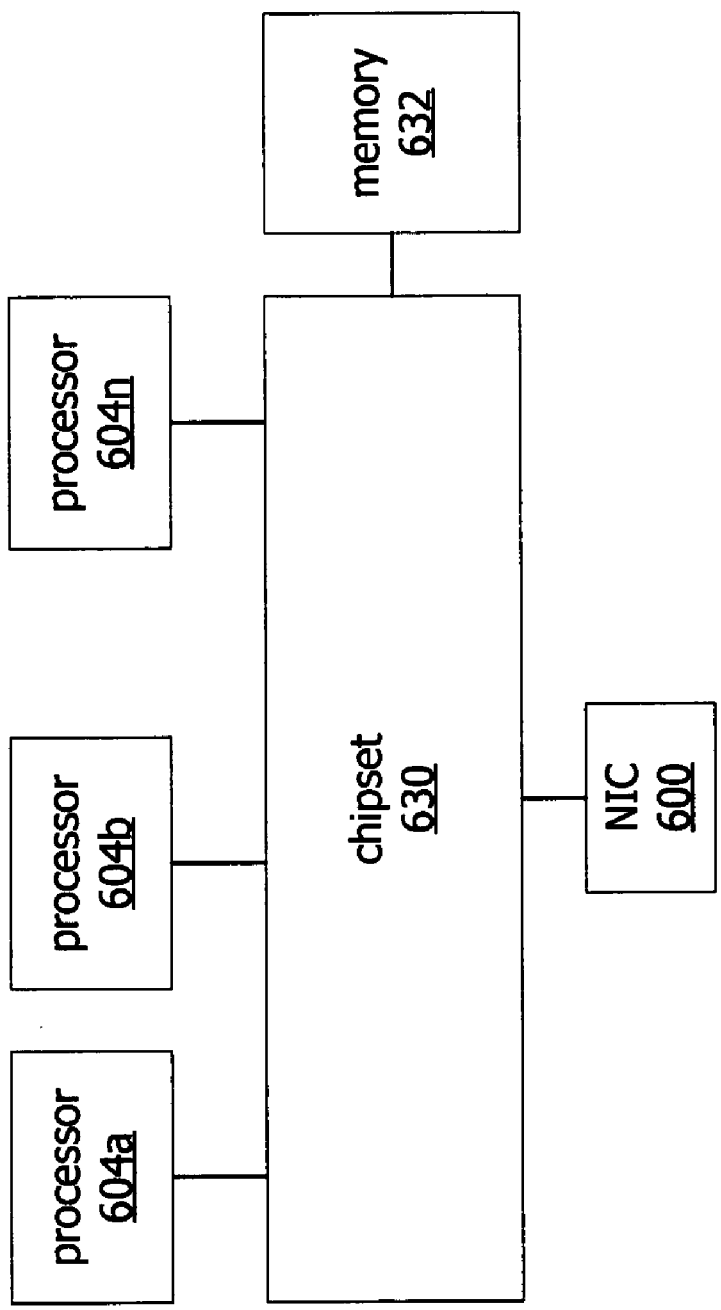
FIG. 9 illustrates a diagram of a computer system.

FIG. 9 illustrates a sample computer architecture that can implement the techniques described above. As shown, the system includes a chipset 630 that couples multiple processors 604a-604n to memory 632 and NIC 600. The processors 604a-604n may include one or more caches. For example, a given processor 604a-604n may feature a hierarchy of caches (e.g., an L2 and L3 cache). The processors 604a-604n may reside on different chips. Alternately, the processors 604a-604n may be different processor cores 604a-604n integrated on a common die.

The chipset 630 may interconnect the different components 600, 632 to the processor(s) 604a-604n, for example, via an Input/Output controller hub. The chipset 630 may include other circuitry (e.g., video circuitry and so forth).

As shown, the system includes a single NIC 600. However, the system may include multiple controllers. The controller(s) can include a physical layer device (PHY) that translates between the analog signals of a communications medium (e.g., a cable or wireless radio) and digital bits. The PHY may be communicatively coupled to a media access controller (MAC) (e.g., via a FIFO) that performs "layer 2" operations (e.g., Ethernet frame handling). The controller can also include circuitry to perform header splitting.

Many variations of the system shown in FIG. 9 are possible. For example, instead of a separate discrete NIC 600, the controller 600 may be integrated within the chipset 630 or a processor 604a-604n.

Figure 10:
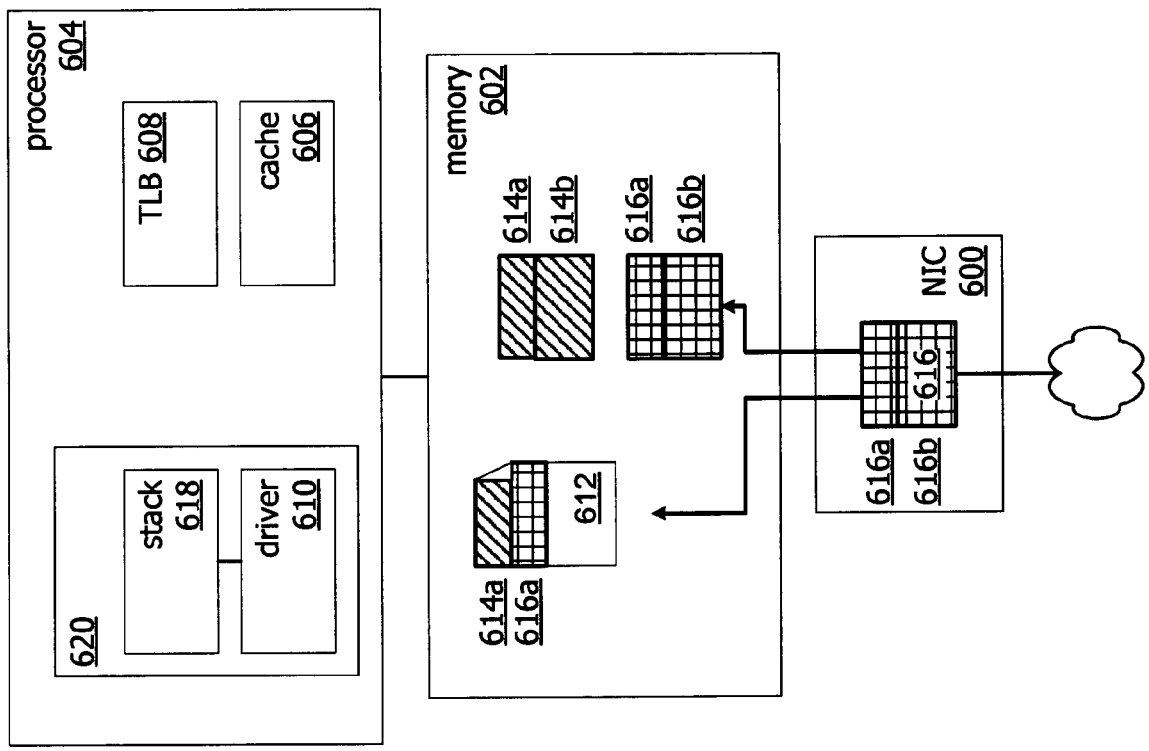
FIG. 10 illustrates a second embodiment to store packet headers.

In an embodiment, as illustrated in FIG. 10, NIC 100 (or network controller 212) may store the header 614a, 616a and payload 614b, 616b in separate buffers, and additionally store the header 614a, 616a to a location in which the payload 614b, 616b is written. Put differently, the payload 614b, 616b may be stored to a first location, while the header 614a, 616a may be stored to the first location, as well as a second location different from the first location. Since some operating systems, such as Microsoft® Windows®, may expect that all packets be passed up to the host stack in a single buffer, this maintains the single buffer requirement for non-offload packets, while allowing the split header feature to be used for off load packets.

Figure 11:
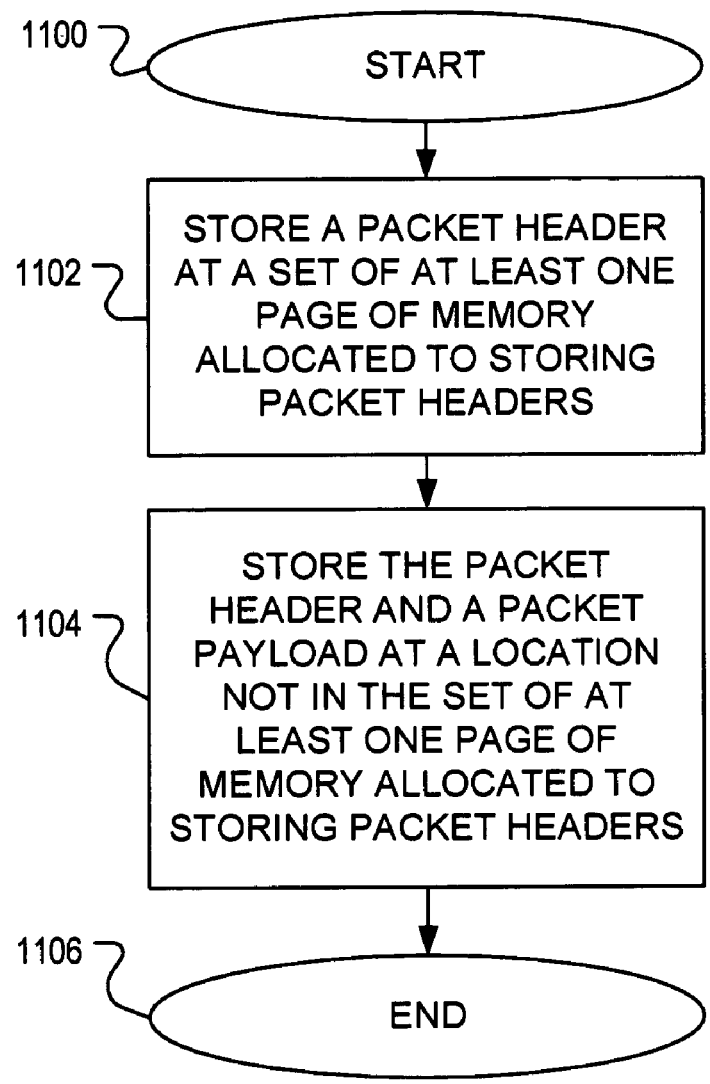
FIG. 11 is a flowchart illustrating a second embodiment to store packet headers.

A method in accordance with this embodiment is illustrated in FIG. 11. The method begins at block 1100, and continues to block 1102 where circuitry may store a packet header at a set of at least one page of memory allocated to storing packet headers.

At block 1104, circuitry may store the packet header and a packet payload at a location not in the set of at least one page of memory allocated to storing packet headers.

The method may end at block 1106.

In an embodiment, blocks 1102-1104 may be accomplished by using the split header feature. In this embodiment, circuitry may split the header and payload from the packet, and may store the header in the at least one page of memory, and store the header and payload at a location not in the set of at least one page of memory. In another embodiment, this may be accomplished by header replication.

The method may end at block 1108.

Figure 12:
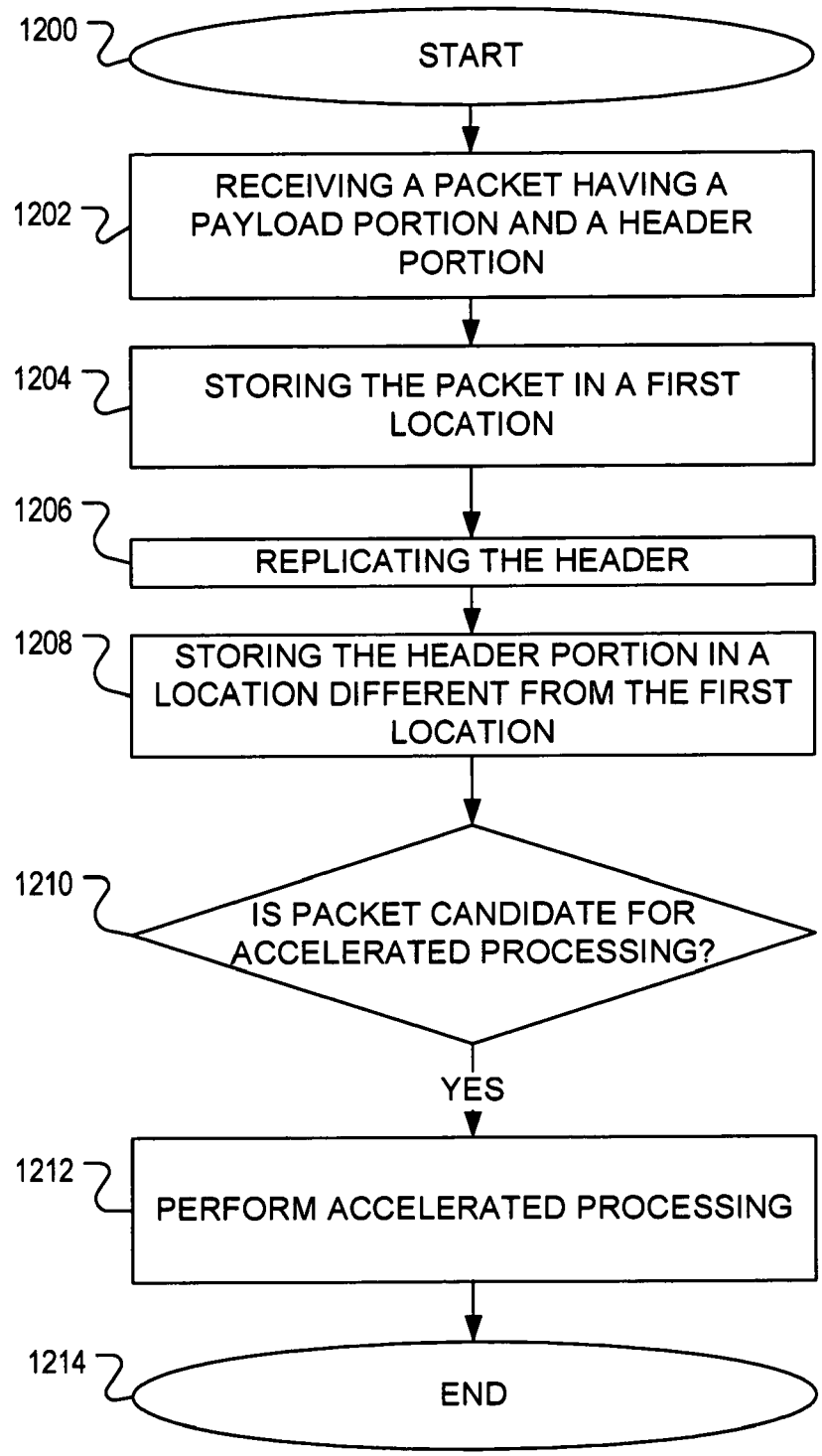
FIG. 12 is a flowchart illustrating header replication.

Another method in accordance with this embodiment is illustrated in FIG. 12. The method begins at block 1200, and continues to block 1202 where circuitry may receive a packet having a payload portion and a header portion. The method may continue to block 1204.

At block 1204, circuitry may store the packet in a first location. The method may continue to block 1206.

At block 1206, circuitry may replicate the header portion. The method may continue to block 1208.

At block 1208, circuitry may store the header portion in a location different from the first location. The method may continue to block 1210.

At block 1210 it may be determined if the packet is a candidate for accelerated processing. The method may continue to block 1212.

At block 1212, if the packet is a candidate for accelerated processing, circuitry may perform accelerated processing on the packet. The method may continue to block 1214.

The method may end at block 1214.

Embodiments of the present invention may be provided, for example, as a computer program product which may include one or more non-transitory machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

CONCLUSION

Therefore, in one embodiment, a method may comprise storing a packet header at a set of at least one page of memory allocated to storing packet headers, storing a packet payload at a location not in the set of at least one page of memory allocated to storing packet headers, and storing the packet header at the location in which the packet payload is stored.

Embodiments of the invention may significantly reduce TCP/IP processing overhead that may result from using the core processing module of a host processor. TCP/IP processing may be accelerated by using a data movement module, such as a DMA engine, to move data from one buffer to another buffer. Since the core processing module of a host processor may be bypassed using a DMA engine, slow memory access speeds may be avoided. Furthermore, TCP/IP processing performed on the host processor may scale better than TOE processing because the number of contexts is not limited by TOE memory.

Furthermore, processing performance of non-offload packets may be improved by storing the packet in one location, and the header in another location. In these embodiments, a header portion of a packet may be placed in a header buffer, and the data portion of the packet may be placed in a data buffer. The header portion may additionally be placed in the data buffer along with the data portion. This may be accomplished by header splitting, or by header replication. For offload packets, the two buffers may be indicated to a driver for accelerated processing, and for non-offload packets, a single buffer comprising the data portion and header portion may be indicated to the driver for non-accelerated processing.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method for accelerated protocol stack processing, comprising:
   receiving and storing a packet at an input buffer of a receiving device, said packet having a packet payload portion and a packet header;
   after receiving said packet at said receiving device, splitting said packet into its constituent packet header and packet payload;
   after splitting and prior to every protocol stack processing at said receiving device, storing said packet header of said packet in a header buffer;
   after splitting and prior to every protocol stack processing at said receiving device, storing the packet header and said packet payload in a data buffer; and
   issuing a prefetch instruction to load the packet header into a cache of a processor if the packet is a candidate for accelerated protocol stack processing.

2. The method of claim 1, additionally comprising:
   determining if the packet is a candidate for accelerated protocol stack processing;
   if the packet is a candidate for accelerated protocol stack processing, indicating the header buffer to a driver that performs accelerated protocol stack processing; and
   if the packet is not a candidate for accelerated protocol stack processing, indicating the data buffer to a driver that performs non-accelerated protocol stack processing.

3. The method of claim 1, additionally comprising performing a memory operation to load the packet header into a translation lookaside buffer of a processor.

4. A method for accelerated protocol stack processing, comprising:
   receiving and storing a packet at an input buffer of a receiving device, said packet having a payload portion and a header portion;
   after receiving said packet at said receiving device, splitting said packet into its constituent header portion and payload portion;
   after splitting and prior to every protocol stack processing at said receiving device, storing the header portion and payload portion in a first location, and storing the header portion in a location that is different from the first location and allocated for storing two or more header portions;
   determining if the packet is an offload packet, and if the packet is an offload packet, performing accelerated protocol stack processing on the packet; and
   issuing a prefetch instruction to load the packet header into a cache of a processor if the packet is a candidate for accelerated protocol stack processing.

5. The method of claim 4, wherein said performing accelerated protocol stack processing comprises performing packet processing on the packet substantially simultaneously while using a data movement module to place the payload for one or more other packets.

6. The method of claim 5, wherein the data movement module comprises a DMA (direct memory access) engine.

7. The method of claim 6, wherein the DMA engine resides on a chipset.

8. An apparatus for accelerated protocol stack processing, comprising:
   circuitry to:
   receive and store a packet at an input buffer of a receiving device, said packet having a payload portion and a header portion;
   after receiving said packet at said receiving device, split said packet into its constituent header portion and payload portion;
   after splitting and prior to every protocol stack processing at said receiving device, store the header portion and payload portion in a first location, and store the header portion in a location that is different from the first location and allocated for storing two or more header portions;
   determine if the packet is an offload packet, and if the packet is an offload packet, perform accelerated protocol stack processing on the packet; and
   issuing a prefetch instruction to load the packet header into a cache of a processor if the packet is a candidate for accelerated protocol stack processing.

9. The apparatus of claim 8, wherein said circuitry to perform accelerated protocol stack processing comprises circuitry to perform packet processing on the packet substantially simultaneously while using a data movement module to place the payload for one or more other packets.

10. The apparatus of claim 9, wherein the data movement module comprises a DMA (direct memory access) engine.

11. The apparatus of claim 10, wherein the DMA engine resides on a chipset.

12. A system for accelerated protocol stack processing, comprising:
   a chipset having a DMA (direct memory access) engine, the chipset communicatively coupled to a transport protocol driver of a processor and to a network controller; and
   circuitry to:
   prior to protocol stack processing, receive a packet at a receiving device having a payload portion and a header portion and store said packet at an input buffer;
   after receiving said packet at said receiving device, split said packet into its constituent header portion and payload portion;
   after splitting and prior to every protocol stack processing at said receiving device, store the header portion and payload portion in a first location, and store the header portion in a location that is different from the first location and allocated for storing two or more header portions;

determine if the packet is an offload packet, and if the packet is an offload packet, perform accelerated protocol stack processing on the packet; and issue a prefetch instruction to load the packet header into a cache of a processor if the packet is a candidate for accelerated protocol stack processing.

13. The system of claim 12, wherein said circuitry to perform accelerated protocol stack processing comprises circuitry to perform packet processing on the packet substantially simultaneously while using a data movement module to place the payload for one or more other packets.

14. The system of claim 13, wherein the data movement module comprises a DMA (direct memory access) engine.

15. The system of claim 14, wherein the DMA engine resides on a chipset.

16. An article comprising a non-transitory computer-readable media having machine-executable instructions, the instructions when executed by a machine, result in a process for accelerated protocol stack processing being carried out, the process including:

receiving and storing a packet at an input buffer at a receiving device, said packet having a payload portion and a header portion;

after receiving said packet at said receiving device, splitting said packet into its constituent header portion and payload portion;

after splitting and prior to every protocol stack processing at said receiving device, storing the header portion and payload portion in a first location, and storing the header portion in a location that is different from the first location and allocated for storing two or more header portions;

determine if the packet is an offload packet at said receiving device, and if the packet is an offload packet, perform accelerated protocol stack processing on the packet; and issue a prefetch instruction to load the packet header into a cache of a processor if the packet is a candidate for accelerated protocol stack processing.

17. The article of claim 16, wherein said instructions that result in performing accelerated protocol stack processing comprises instructions that result in performing packet processing on the packet substantially simultaneously while using a data movement module to place the payload for one or more other packets.

18. The article of claim 17, wherein the data movement module comprises a DMA (direct memory access) engine.

19. The article of claim 18, wherein the DMA engine resides on a chipset.

* * * * *